United States Patent
Izumi

(10) Patent No.: US 10,543,568 B2
(45) Date of Patent: Jan. 28, 2020

(54) LASER PROCESSING HEAD INCLUDING CIRCULATION PATH FOR CIRCULATING COOLANT

(71) Applicant: FANUC CORPORATION, Yamanashi (JP)

(72) Inventor: Takashi Izumi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 518 days.

(21) Appl. No.: 15/353,829

(22) Filed: Nov. 17, 2016

(65) Prior Publication Data

US 2017/0136581 A1 May 18, 2017

(30) Foreign Application Priority Data

Nov. 18, 2015 (JP) .................. 2015-225893

(51) Int. Cl.
*B23K 26/00* (2014.01)
*B23K 26/70* (2014.01)
*H01S 3/00* (2006.01)
*H01S 3/223* (2006.01)

(52) U.S. Cl.
CPC .......... *B23K 26/703* (2015.10); *H01S 3/0071* (2013.01); *H01S 3/2232* (2013.01)

(58) Field of Classification Search
CPC .. B23K 26/00; B23K 26/703; B23K 26/1462; B23K 26/032
USPC ............... 219/121.6, 121.61, 121.83, 121.84
See application file for complete search history.

(56) References Cited

U.S. PATENT DOCUMENTS

| 4,730,885 A * | 3/1988 | Doi ...................... G02B 6/3814 385/75 |
| 5,060,238 A * | 10/1991 | Karube ................... H01S 3/036 372/58 |
| 5,481,556 A * | 1/1996 | Daikuzono ............. H01S 3/025 372/34 |
| 2002/0018497 A1* | 2/2002 | Naito .................. A61F 9/00821 372/34 |
| 2006/0013274 A1* | 1/2006 | Nishikawa ............... H01S 3/04 372/35 |
| 2015/0352666 A1* | 12/2015 | Fujita ..................... B23K 26/14 219/121.61 |
| 2017/0045462 A1* | 2/2017 | Ohno ..................... G01N 21/94 |

FOREIGN PATENT DOCUMENTS

| CN | 200960581 Y | 10/2007 |
| CN | 101434006 A | 5/2009 |
| CN | 103386553 A | 11/2013 |
| CN | 203426600 U | 2/2014 |
| JP | H03284889 A | 12/1991 |
| JP | H08215867 A | 8/1996 |

(Continued)

*Primary Examiner* — Dana Ross
*Assistant Examiner* — Ayub A Maye
(74) *Attorney, Agent, or Firm* — RatnerPrestia

(57) ABSTRACT

A laser processing head able to prevent leakage of a coolant out of a flow path or a coolant supply pipe. The laser processing head includes a closed-circulation path that circulates the coolant for removing the heat generated in the laser processing head due to a laser beam propagating in the laser processing head, and a coolant circulation device that allows the coolant to flow in the circulation path and circulates the coolant in the circulation path.

4 Claims, 13 Drawing Sheets

(56) References Cited

FOREIGN PATENT DOCUMENTS

| JP | H09-277074 A | 10/1997 |
| JP | 2002045371 A | 2/2002 |
| JP | 2002335029 A | 11/2002 |
| JP | 2002346784 A | 12/2002 |
| JP | 2011152546 A | 8/2011 |

\* cited by examiner

LASER PROCESSING HEAD INCLUDING CIRCULATION PATH FOR CIRCULATING COOLANT

BACKGROUND OF THE INVENTION

1. Field of the Invention

The invention relates to a laser processing head including a circulation path for circulating a coolant.

2. Description of the Related Art

To cool a laser processing head, allowing a coolant, such as cooling water, to flow in a flow path provided in the laser processing head are known (for example, Japanese Unexamined Patent Publication (Kokai) No. H9-277074).

Hitherto, connecting a coolant supply pipe extending from a coolant supply device installed in the exterior of the laser processing head to the flow path as described above, and supplying the coolant through the coolant supply pipe from the coolant supply device into the flow path have been required.

In such a laser processing head, when an operation, such as detaching the coolant supply pipe from the flow path, for maintenance of the laser processing head and the like is performed, there have been cases in which the coolant leaks out of the flow path or the coolant supply pipe and adheres to a constituting element of the laser processing head to contaminate an optical member.

In addition, hitherto, to prevent condensation when cooling is performed, monitoring and controlling an outdoor temperature, humidity, and a coolant temperature have been required. Further, in many cases, the laser processing head is movable, and when the coolant is introduced from the exterior, a laying method and a material that suppress occurrence of breakage, damage due to fatigue, and the like of a member, such as the coolant supply pipe, have been required.

SUMMARY OF INVENTION

A laser processing head which condenses and radiates a laser beam onto a workpiece (W) includes a closed circulation path which circulates a coolant for removing heat generated in the laser processing head due to the laser beam propagating in the laser processing head, and a coolant circulation device which causes the coolant to flow in the circulation path so as to circulate in the circulation path.

The laser processing head may further include a main body which holds an optical member which condenses the laser beam. The circulation path may be defined by a hole formed at the main body or a pipe attached to the main body.

The laser processing head may further include a heat dissipation fin disposed adjacent to the circulation path. The laser processing head may further include a fan which generates an air flow to remove the heat from the laser processing head.

The laser processing head may further include a temperature detection part which detects a temperature of the laser processing head, and a fan controller which controls the fan based on the temperature detected by the temperature detection part. The laser processing head may further include a fan controller which controls the fan based on a command transmitted by a laser oscillator controller to a laser oscillator in order to cause the laser oscillator to generate the laser beam.

The laser processing head may further include a fan monitor which monitors an operation of the fan. The laser processing head may further include a circulation device monitor which monitors an operation of the coolant circulation device.

BRIEF DESCRIPTION OF THE DRAWINGS

The above or other objects, features, and advantages of the invention will be clarified from the following description of embodiments with reference to the accompanying drawings, in which.

DETAILED DESCRIPTION

Figure 1:
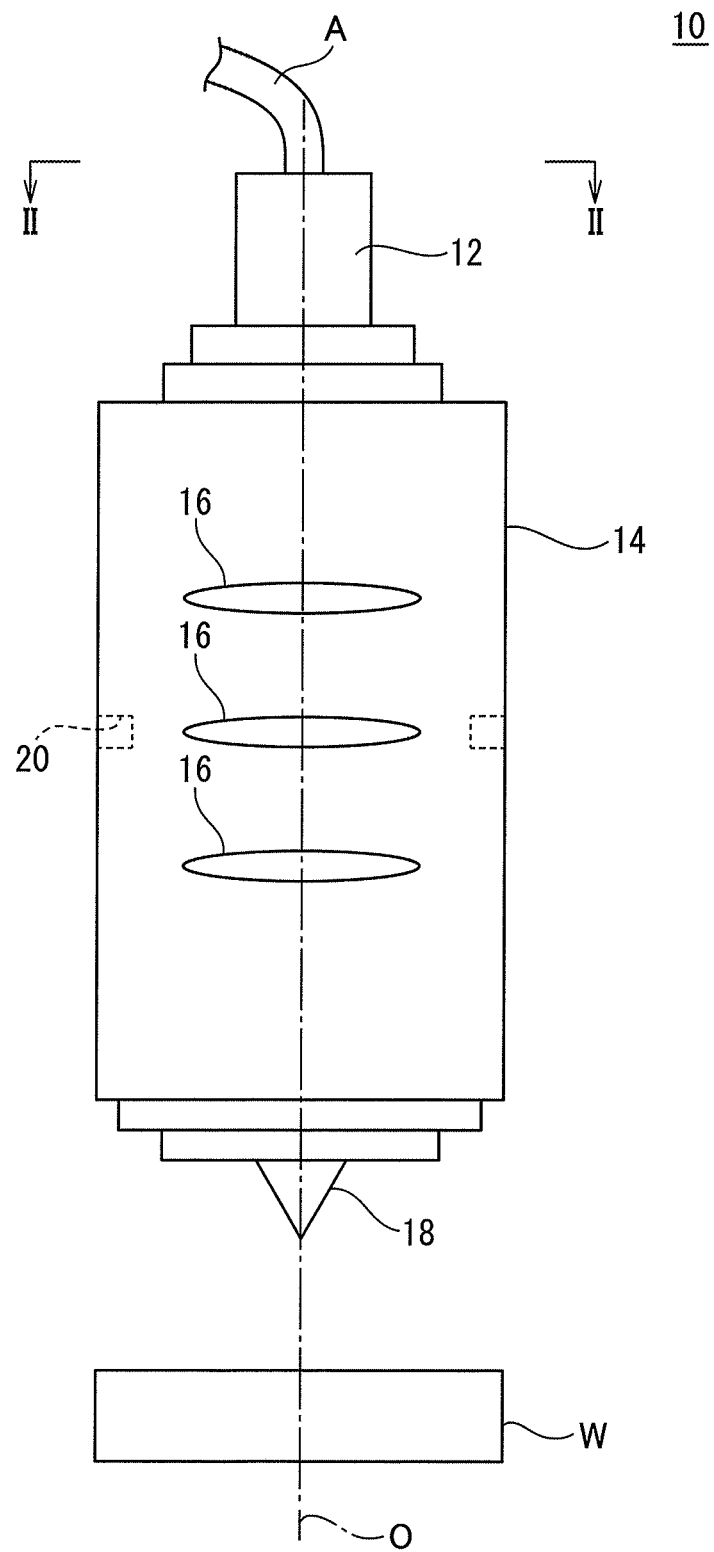
FIG. 1 is a diagram of a laser processing head according to an embodiment of the invention.

Hereinafter, embodiments of the invention will be described in detail with reference to the drawings. First, with reference to FIGS. 1 and 2, a laser processing head 10 according to an embodiment of the invention will be described.

Note that, in the following description, the axial direction indicates a direction along an optical axis O of a laser beam propagating in the laser processing head 10. Further, the circumferential direction indicates a circumferential direction of a circle centered about the optical axis O, and a radial direction indicates a direction of radius of the circle centered about the optical axis O.

The laser processing head 10 is optically connected to a laser oscillator (not shown) via an optical fiber A. The laser processing head 10 receives a laser beam emitted from the laser oscillator, and condenses the received laser beam so as to radiate it onto a workpiece W.

The laser processing head 10 includes a connection 12, a main body 14, optical members 16, a nozzle 18, a circulation path 20, and a coolant circulation device 22. The optical fiber A is connected to the connection 12. The connection 12 receives the laser beam propagating through the optical fiber A, and guides it to the optical members 16.

The main body 14 is a hollow member, and defines an optical path of the laser beam inside thereof. The main body 14 holds the optical members 16. The optical members 16 includes e.g. a focus lens, and is disposed on the optical path of the laser beam defined in the main body 14. The optical members 16 condense the laser beam propagating from the connection 12, and guide it to the nozzle 18.

The nozzle 18 emits the laser beam condensed by the optical members 16 toward the workpiece W. The workpiece W is laser machined by the laser beam thus-radiated onto the workpiece W.

The circulation path 20 is a closed-flow path for circulating a liquid or gas coolant. In this embodiment, the circulation path 20 is defined by a hole formed at the main body 14, and extends in the circumferential direction so as to surround the optical members 16. The coolant includes e.g. water, a long-life coolant, or a solution to which an anticorrosion material is added.

The coolant circulation device 22 is e.g. an electric pump, and includes a rotor disposed in the circulation path 20 and a motor which rotates the rotor. The coolant circulation device 22 generates pressure fluctuations in the fluid enclosed in the circulation path 20 so as to cause the fluid to flow in the circulation path 20. Thereby, the coolant circulates in the circulation path 20.

Thus, the circulation path 20 is a closed-flow path which can enclose and seal the fluid in the circulation path 20, and circulate the enclosed fluid when the fluid is caused to flow, without being fluidly connected to an external equipment (e.g., a coolant supply device) installed outside of the laser processing head 10.

If the laser beam from the optical fiber A is received at the connection 12, scattered light contained in the laser beam enters the connection 12 so as to be absorbed there. Thereby, heat is generated in the connection 12. Further, the laser beam incident on the optical members 16 is absorbed by the optical members 16, thereby heat is generated in the optical member.

Thus, due to the laser beam propagating in the optical path in the laser processing head 10, heat is generated in the components of the laser processing head 10. In order to remove the thus-generated heat, the coolant is enclosed in the circulation path 20, and the coolant circulation device 22 circulates the coolant in the circulation path 20.

Figure 3:
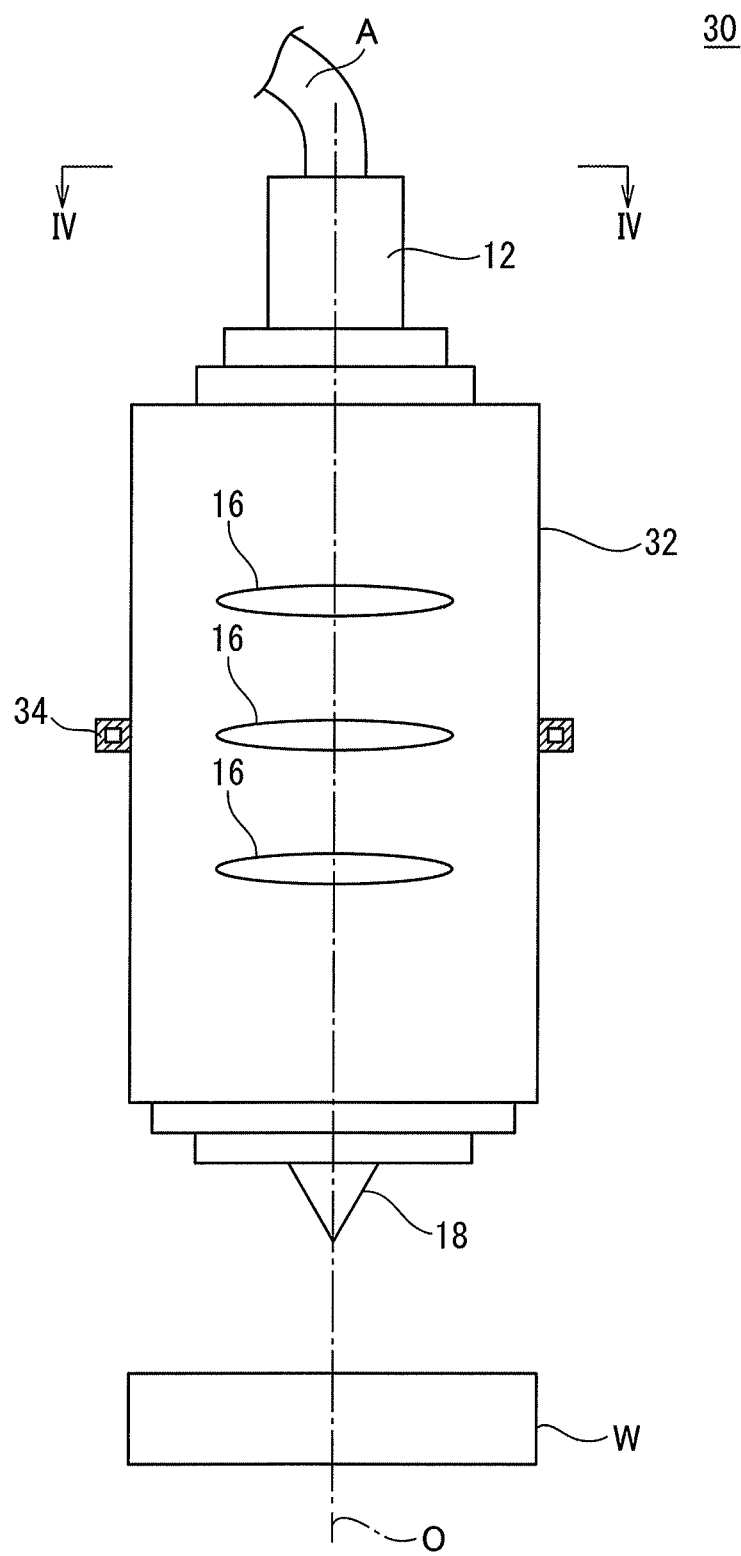
FIG. 3 is a diagram of a laser processing head according to another embodiment of the invention.
Figure 4:
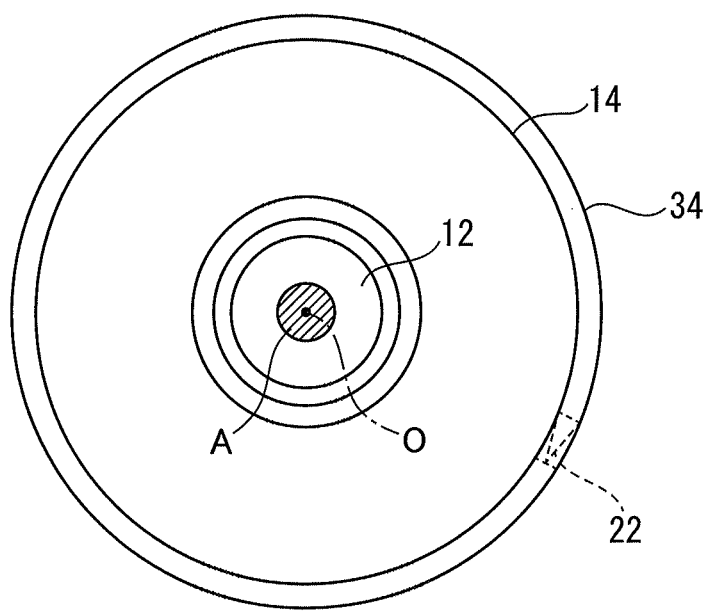
FIG. 4 is a cross-sectional view of the laser processing head as shown in FIG. 3 cut along IV-IV in FIG. 3 and seen from axially upper direction (i.e. upward in FIG. 3)

Next, with reference to FIGS. 3 and 4, a laser processing head 30 according to another embodiment of the invention will be described. Note that, in the various embodiments described below, elements similar to those in the already-mentioned embodiments will be assigned the same reference numerals, and the detailed descriptions thereof will be omitted.

The laser processing head 30 includes the connection 12, a main body 32, the optical members 16, the nozzle 18, a circulation path 34, and the coolant circulation device 22. Similar to the above-mentioned circulation path 20, the circulation path 34 is a closed-flow path for circulating the coolant.

In this embodiment, the circulation path 34 is defined by a pipe separate from the main body 32 and attached to a circumference of the main body 32. The circulation path 34 extends in the circumferential direction so as to surround the optical members 16. The coolant circulation device 22 circulates the fluid enclosed in the circulation path 34.

Figure 5:
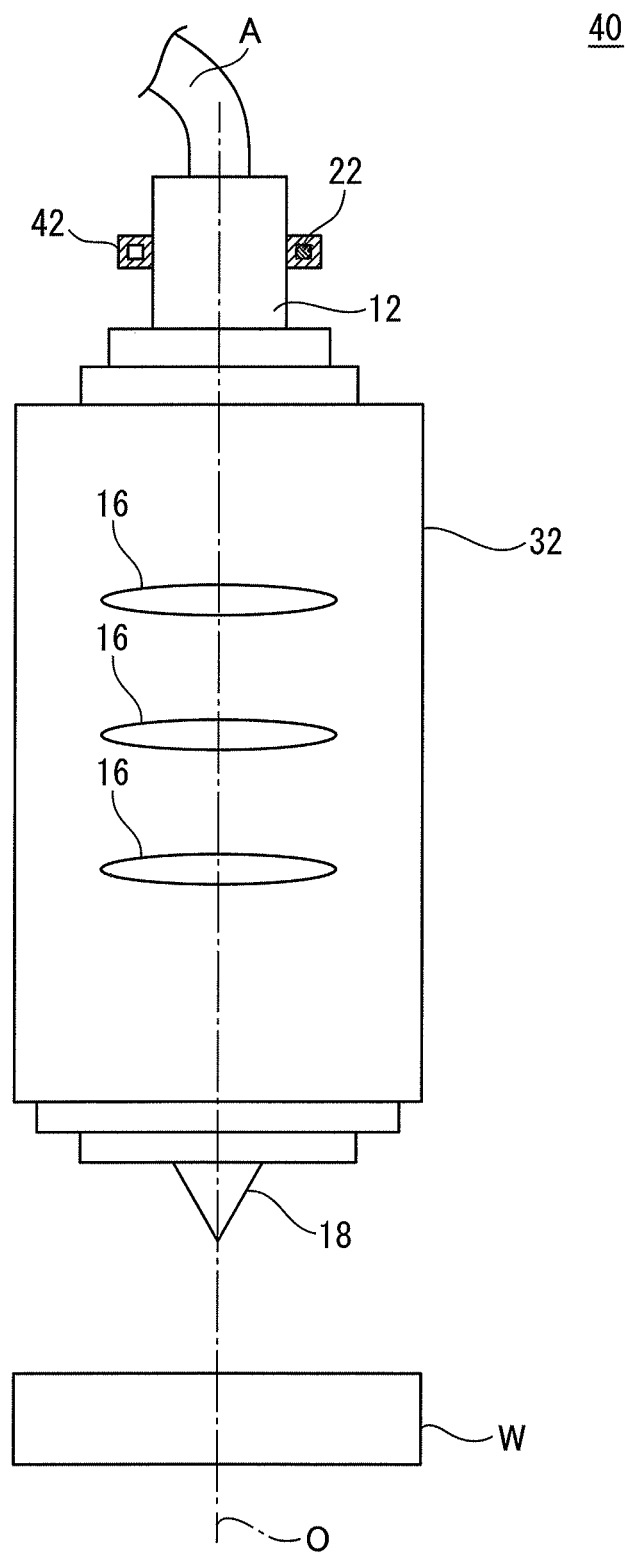
FIG. 5 is a diagram of a laser processing head according to still another embodiment, in which the circulation path is indicated by cross section.

Next, with reference to FIG. 5, a laser processing head 40 according to still another embodiment of the invention will be described. The laser processing head 40 includes the connection 12, the main body 32, the optical members 16, the nozzle 18, a circulation path 42, and the coolant circulation device 22.

Similar to the above-mentioned circulation paths 20 and 34, the circulation path 42 is a closed-flow path for circulating the coolant. In this embodiment, the circulation path 42 is defined by a pipe separate from the connection 12 and attached to a circumference of the connection 12.

The circulation path 42 extends in the circumferential direction at radially outside of the connection 12. The coolant circulation device 22 circulates the fluid enclosed in the circulation path 42. Note that, the circulation path 42 may be defined by a hole formed at the connection 12.

In the above-mentioned laser processing heads 10, 30 and 40, the circulation paths 20, 34 and 42 are configured as a closed-flow path. Accordingly, by operating the coolant circulation device 22, the coolant can be circulated in the laser processing heads 10, 30 and 40, whereby the heat generated in the laser processing heads 10, 30 and 40 can be removed.

According to these configurations, it is not necessary to supply the coolant to the circulation paths 20, 34 and 42 from the external equipment (e.g., the coolant supply device). Therefore, it is not necessary to provide a joint, which connects a member such as a coolant supply pipe extending from the external equipment, at the circulation paths 20, 34, 42.

Accordingly, the possibility of leakage of the coolant due to an operation of detaching the coolant supply pipe from the joint or an attachment defect of the joint to the coolant supply pipe can be eliminated. Thereby, it is possible to reliably prevent a component such as the optical members 16 from being contaminated due to leakage of the coolant.

Further, since the coolant is not supplied to the circulation paths 20, 34 and 42 from the external equipment, it is not necessary for a user to perform a quality control (e.g., a temperature, or a pH value) of the coolant supplied from the external equipment. On the other hand, the user can easily control the quality of the coolant by periodically changing the coolant in the circulation paths 20, 34 and 42.

Further, the circulation paths 20 and 34 are disposed so as to surround the optical members 16, and the circulation path 42 is disposed so as to surround the connection 12. According to these configurations, it is possible to effectively cool the component of the laser processing heads 10, 30 and 40, which is apt to be heated due to the laser beam propagating in the laser processing heads 10, 30 and 40.

Next, with reference to FIGS. 6 and 7, a laser processing head 50 according to still another embodiment will be described. The laser processing head 50 includes a connection 52, a main body 54, the optical members 16, the nozzle 18, a circulation path 56, the coolant circulation device 22, a heat dissipation fin 57, a fan 60, a temperature detection part 62, and a controller 64.

The controller 64 includes e.g. a CPU and a storage (both not shown), and directly or indirectly controls each component of the laser processing head 50. The controller 64 is mounted on the main body 54.

The connection 52 receives the laser beam propagating through the optical fiber A, and guides it to the optical members 16. The main body 54 is a hollow member, and defines an optical path of the laser beam inside thereof. The main body 54 holds the optical members 16.

The circulation path 56 is a closed-flow path for circulating the coolant. In this embodiment, the circulation path 56 is defined by holes formed at the connection 52 and the main body 54.

Specifically, the circulation path 56 includes a flow path 56a defined by the hole formed at the connection 52, and a flow path 56b defined by the hole formed at the main body 54. The flow paths 56a and 56b are in fluid communication with each other, and form the closed-circulation path 56.

The coolant circulation device 22 includes a rotor (not shown) disposed in the circulation path 56 and a motor 58 (FIG. 7) which rotates the rotor. The motor 58 is e.g. a servo motor, and rotates the rotor in accordance with a command from the controller 64.

Thus, the coolant circulation device 22 generates pressure fluctuations in the fluid enclosed in the circulation path 56 so as to cause the fluid to flow in the circulation path 56.

An encoder 68 (FIG. 7) is attached to the coolant circulation device 22. The encoder 68 detects a rotation speed of the rotor of the coolant circulation device 22, and transmits data of the rotation speed to the controller 64.

The heat dissipation fin 57 is mounted on an outer surface of the main body 54. The heat dissipation fin 57 is disposed adjacent to a portion 56c of the flow path 56a, and dissipates the heat from the coolant flowing in the portion 56c.

The fan 60 is disposed adjacent to the heat dissipation fin 57. Specifically, the fan 60 includes a rotor (not shown) having a plurality of vanes, and a fan motor 66 (FIG. 7) which rotates the rotor. The fan 60 is disposed so as to generate an air flow passing through the heat dissipation fin 57.

An encoder 70 (FIG. 7) is attached to the fan 60. The encoder 70 detects a rotation speed of the rotor of the fan 60, and transmits data of the rotation speed to the controller 64.

The temperature detection part 62 includes e.g. a thermoelectric couple or a platinum temperature measurement resistor, and is mounted on the main body 54. The temperature detection part 62 detects a temperature at a portion where the temperature detection part 62 is disposed, and transmits data of the temperature to the controller 64.

Figure 8:
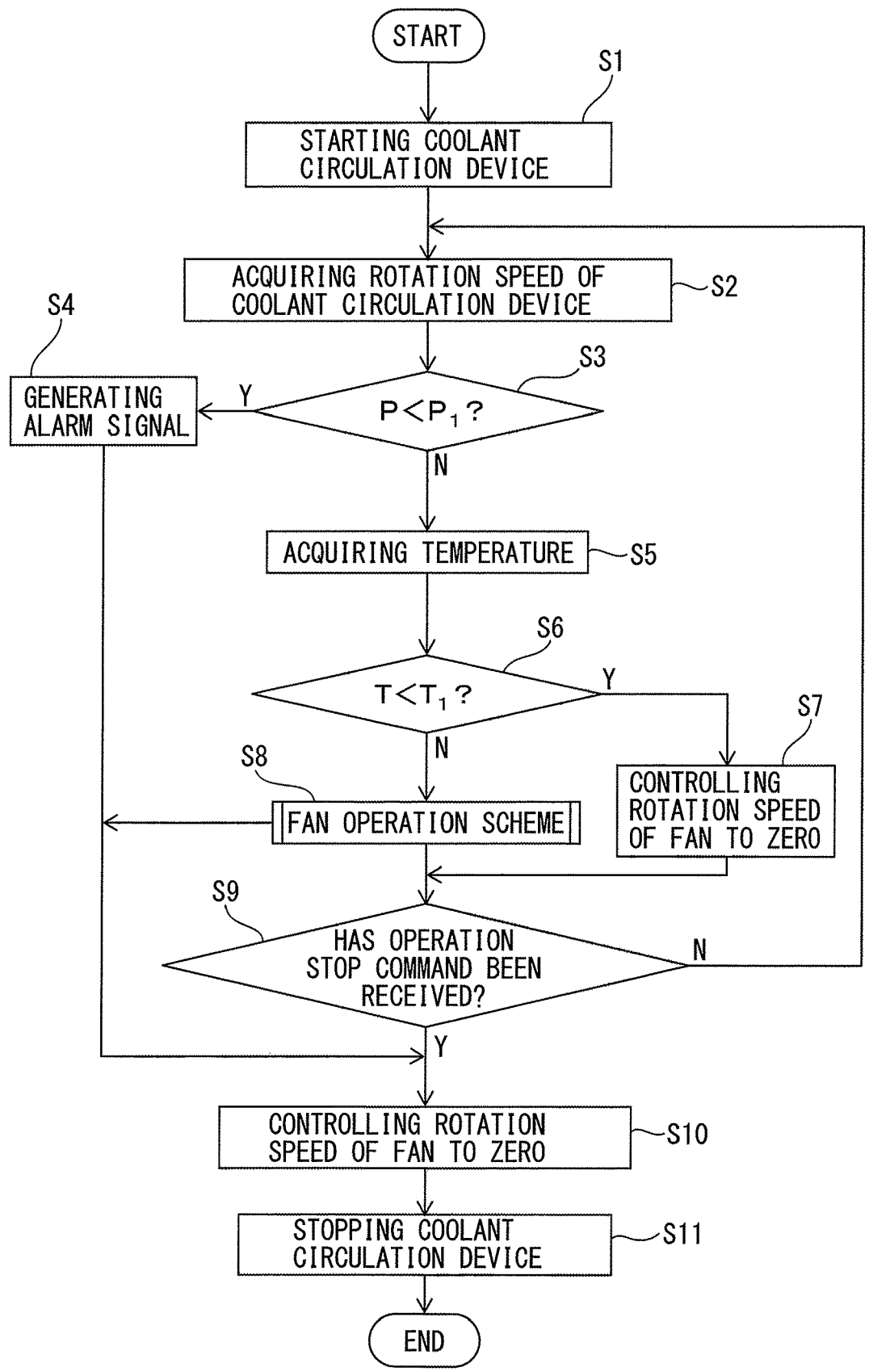
FIG. 8 is a flowchart showing an example of an operation flow of the laser processing head shown in FIG. 6.
Figure 9:
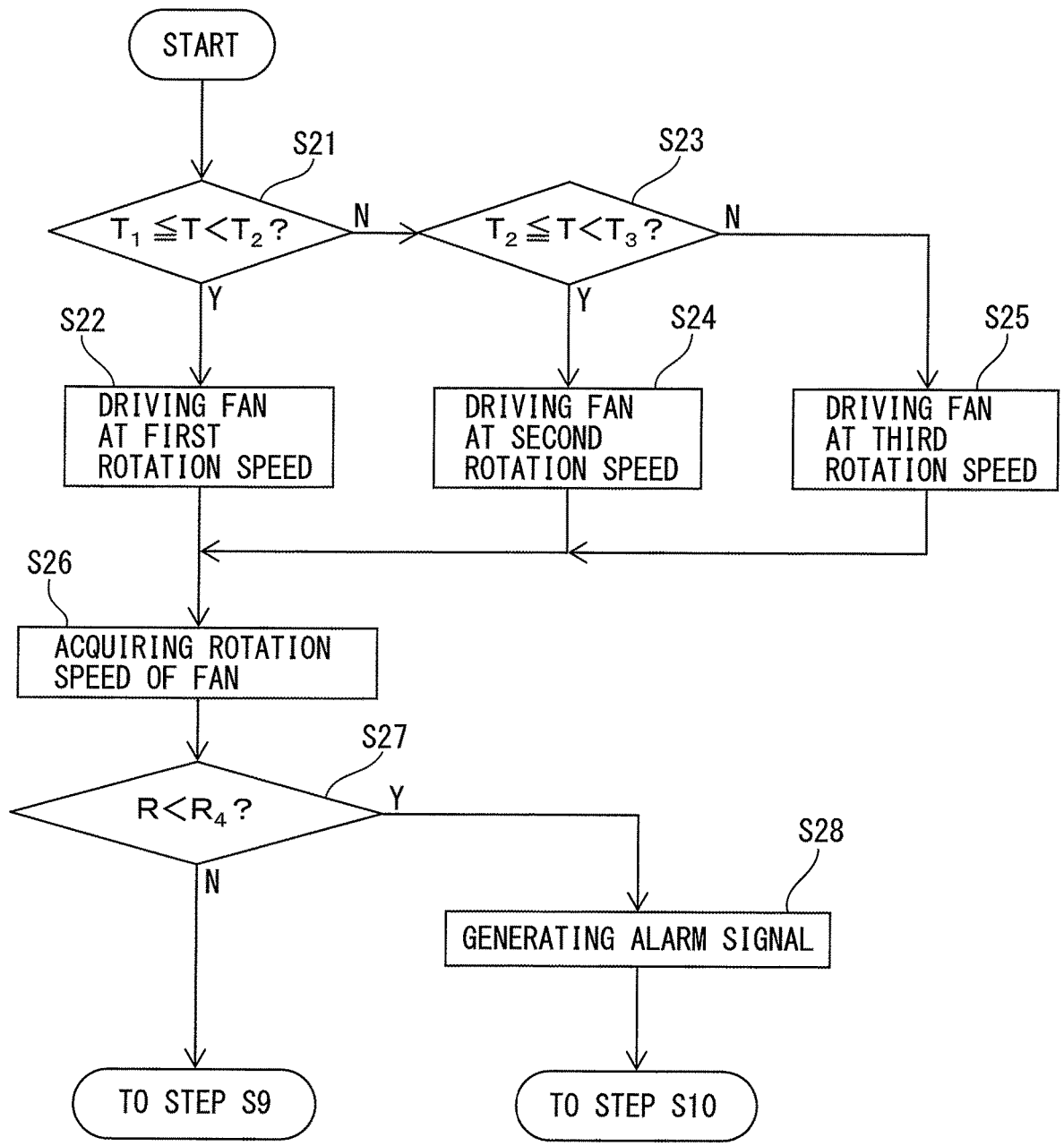
FIG. 9 is a flowchart showing an example of a flow of step S8 in FIG. 8.

Next, with reference to FIGS. 8 and 9, an operation of the laser processing head 50 will be described. The flow shown in FIG. 8 is started when the controller 64 receives an operation command from the user, a host controller, a laser machining program, or the like.

At step S1, the controller 64 starts the operation of the coolant circulation device 22. Specifically, the controller 64 transmits a rotation command to the motor 58 so as to rotate the rotor of the coolant circulation device 22 at a predetermined rotation speed $P_0$. Thereby, the fluid enclosed in the circulation path 56 flows and circulates in the circulation path 56.

At step S2, the controller 64 acquires a rotation speed P of the coolant circulation device 22. Specifically, the controller 64 transmits a command to the encoder 68 so as to detect the rotation speed P of the rotor of the coolant circulation device 22. The controller 64 acquires data of the rotation speed P from the encoder 68.

At step S3, the controller 64 determines whether or not the rotation speed P acquired at step S2 is less than a predetermined threshold value $P_1$ of the rotation speed (i.e., $P<P_1$).

The threshold value $P_1$ is a lower limit value of the rotation speed P ($0<P_1<P_0$), for which the coolant circulation device 22 can be estimated to normally operate. The threshold value $P_1$ is predetermined by the user, and stored in the storage of the controller 64. As an example, the threshold value $P_1$ is set to be 50% of the rotation command $P_0$ transmitted to the motor 58 at step S1.

When the controller 64 determines that P is less than $P_1$ (i.e., determines "YES"), it proceeds to step S4. On the other hand, when the controller 64 determines that P is equal to or greater than $P_1$ (i.e., determines "NO"), it proceeds to step S5.

At step S4, the controller 64 generates an alarm signal. For example, the controller 64 generates an alarm signal in the form of an image or sound indicating "Abnormality occurs in operation of coolant circulation device." Then, the controller 64 transmits the generated alarm signal to a display or speaker (not shown), and notifies the user of the alarm via the display or the speaker.

Thus, in this embodiment, the controller 64 monitors the rotation speed P of the coolant circulation device 22 at steps S2 and S3, and when an abnormality is found in a rotation operation (i.e., it is determined "YES" at step S3), the controller 64 sends the alarm to the user at step S4. Accordingly, the controller 64 functions as a circulation device monitor 72 (FIG. 7) which monitors the operation of the coolant circulation device 22.

At step S5, the controller 64 acquires a temperature T of the laser processing head 50. Specifically, the controller 64 transmits a command to the temperature detection part 62 so as to detect the temperature T of the laser processing head 50. The controller 64 acquires data of the temperature T from the temperature detection part 62.

At step S6, the controller 64 determines whether or not the temperature T acquired at step S5 is lower than a predetermined threshold value $T_1$ of the temperature (i.e., $T<T_1$). The threshold value $T_1$ is a lower limit value of the temperature of the laser processing head 50, which makes it unnecessary to operate the fan 60. The threshold value $T_1$ is predetermined by the user, and stored in the storage of the controller 64.

When the controller 64 determines that T is less than $T_1$ (i.e., determines "YES"), it proceeds to step S7. On the other hand, when the controller 64 determines that T is equal to or higher than $T_1$ (i.e., determines "NO"), it proceeds to step S8.

At step S7, the controller 64 controls the rotation speed R of the fan 60 to zero. Specifically, the controller 64 transmits a command to the fan motor 66 so as to stop the rotation of the fan motor 66.

At step S8, the controller 64 carries out an operation scheme of the fan 60. Step S8 will be described with reference to FIG. 9.

After step S8 is started, at step S21, the controller 64 determines whether or not the temperature T acquired at step S5 most-recently executed is equal to or higher than the above-mentioned threshold value $T_1$ and is lower than a predetermined threshold value $T_2$ of the temperature (i.e., $T_1 \leq T < T_2$). The threshold value $T_2$ is predetermined by the user so as to be higher than the threshold value $T_1$, and stored in the storage of the controller 64.

When the controller 64 determines that $T_1 \leq T < T_2$ is satisfied (i.e., determines "YES"), it proceeds to step S22. On the other hand, when the controller 64 determines that T is equal to or higher than $T_2$ (i.e., determines "NO"), it proceeds to step S23.

At step S22, the controller 64 drives the fan 60 at a first rotation speed $R_1$. Specifically, the controller 64 generates a first rotation command corresponding to the first rotation speed $R_1$, and transmits it to the fan motor 66. In accordance with the first rotation command, the fan motor 66 rotates the rotor of the fan 60 at the first rotation speed $R_1$.

At step S23, the controller 64 determines whether or not the temperature T acquired at step S5 most-recently carried out is equal to or higher than the above-mentioned threshold value $T_2$ and is lower than a predetermined threshold value $T_3$ of the temperature (i.e., $T_2 \leq T < T_3$). The threshold value $T_3$ is predetermined by the user so as to be higher than the threshold value $T_2$, and stored in the storage of the controller 64.

When the controller 64 determines that $T_2 \leq T < T_3$ is satisfied (i.e., determines "YES"), it proceeds to step S24. On the other hand, when the controller 64 determines that T is equal to or higher than $T_3$ (i.e., determines "NO"), it proceeds to step S25.

At step S24, the controller 64 drives the fan 60 at a second rotation speed $R_2$ ($>R_1$). Specifically, the controller 64 generates a second rotation command corresponding to the second rotation speed $R_2$, and transmits it to the fan motor 66. In accordance with the second rotation command, the fan motor 66 rotates the rotor of the fan 60 at the second rotation speed $R_2$.

At step S25, the controller 64 drives the fan 60 at a third rotation speed $R_3$ ($>R_2$). Specifically, the controller 64 generates a third rotation command corresponding to the third rotation speed $R_3$, and transmits it to the fan motor 66.

In accordance with the third rotation command, the fan motor 66 rotates the rotor of the fan 60 at the third rotation speed $R_3$. As an example, the third rotation speed $R_3$ is set to be a maximum allowable rotation speed of the fan 60.

Thus, in this embodiment, the controller 64 operates the fan 60 at a rotation speed depending on the temperature T detected by the temperature detection part 62, at steps S21 to S25. Accordingly, the controller 64 functions as a fan controller 74 (FIG. 7) which controls the fan 60 based on the temperature T detected by the temperature detection part 62.

At step S26, the controller 64 acquires the rotation speed R of the fan 60. Specifically, the controller 64 transmits a command to the encoder 70 so as to detect the rotation speed R of the rotor of the fan 60, and acquires data of the rotation speed R from the encoder 70.

At step S27, the controller 64 determines whether or not the rotation speed R acquired at step S26 is less than a predetermined threshold value $R_4$ of the rotation speed (i.e., $R<R_4$). The threshold value $R_4$ is a lower limit value of the rotation speed R, for which the fan 60 can be estimated to normally operate. The threshold value $R_4$ is predetermined by the user, and stored in the storage of the controller 64. As an example, the threshold value $R_4$ is set to be 50% of the rotation command $R_1$, $R_2$, or $R_3$ transmitted by the controller 64 to the fan motor 66 at step S22, S24, or S25, respectively.

When the controller 64 determines that R is less than $R_4$ (i.e., determines "YES"), it proceeds to step S28. On the other hand, when the controller 64 determines that R is equal to or greater than $R_4$ (i.e., determines "NO"), it proceeds to step S9 in FIG. 8.

At step S28, the controller 64 generates an alarm signal. For example, the controller 64 generates an alarm signal in the form of an image or sound indicating "Abnormality occurs in operation of fan." Then, the controller 64 transmits the generated alarm signal to the display or the speaker (not shown) so as to notifies the user of the alarm via the display or the speaker.

Thus, in this embodiment, the controller 64 monitors the rotation speed R of the fan 60 at steps S26 and S27, and when an abnormality is found in the rotation operation (i.e., it is determined "YES" at step S27), the controller 64 sends the alarm to the user at step S28. Accordingly, the controller 64 functions as a fan monitor 76 (FIG. 7) which monitors an operation of the fan 60.

With reference to FIG. 8 again, at step S9, the controller 64 determines whether or not it receives an operation stop command from the user, the host controller, the laser machining program, or the like. When the controller 64 determines that it receives the operation stop command (i.e., determines "YES"), it proceeds to step S10. On the other hand, when the controller 64 determines that it does not receive the operation stop command (i.e., determines "NO"), it returns to step S2.

At step S10, the controller 64 controls the rotation speed R to zero, similarly to the above-mentioned step S7.

At step S11, the controller 64 stops the coolant circulation device 22. Specifically, the controller 64 transmits a command to the motor 58 so as to stop the motor 58 of the coolant circulation device 22. Then, the controller 64 ends the flow shown in FIG. 8.

In this embodiment, since the circulation path 56 is configured as a closed-flow path, it is possible to circulate the coolant in the laser processing head 50 by operating the coolant circulation device 22.

According to this configuration, it is not necessary to supply the coolant from the external equipment (the coolant supply device) to the circulation path 56, and therefore it is not necessary to provide a joint, which connects a member such as the coolant supply pipe extending from the external equipment, at the circulation path 56.

Accordingly, the possibility of leakage of the coolant from the joint can be eliminated, and therefore, it is possible to reliably prevent a component such as the optical members 16 from being contaminated due to leakage of the coolant.

Further, it is not necessary to supply the coolant from the external equipment to the circulation path 56, and therefore, it is not necessary for the user to perform a quality control (for example, a temperature and a pH value) of the coolant supplied from the external equipment. On the other hand, the user can easily control the quality of the coolant by periodically changing the coolant in the circulation path 56.

Further, in this embodiment, using the heat dissipation fin 57 and the fan 60, the heat is dissipated from the coolant flowing in the circulation path 56 in a so-called air-cooled manner. According to this configuration, since the temperature of the components of the laser processing head 50 does not decrease to be lower than the dew point, it is possible to prevent dew condensation in the components of the laser processing head 50.

Further, in this embodiment, the controller 64 detects the temperature T of the laser processing head 50, and operates the fan 60 at a rotation speed depending on the temperature T (steps S21 to S25). According to this configuration, since the operation efficiency of the fan 60 can be optimized, it is possible to restrain power consumption.

Further, in this embodiment, the controller 64 monitors the operation of the fan 60, and warns the user (step S28) if an abnormality in the operation of the fan 60 is detected (i.e., it is determined "YES" at step S27.

According to this configuration, if a malfunction, in which foreign matters, such as dusts, adheres to the rotor of the fan 60 so as to disturb the rotation of the rotor, occurs, the user can automatically and instinctively recognize the malfunction, and consequently can promptly take a countermeasure, such as replacement or repair of the fan 60.

Further, in this embodiment, the controller 64 monitors the operation of the coolant circulation device 22, and the controller 64 warns the user (step S4) if an abnormality in the operation of the coolant circulation device 22 is detected (i.e., it is determined "YES" at step S3).

According to this configuration, if a malfunction, in which foreign matters, such as dusts, adheres to the rotor of the coolant circulation device 22 so as to disturb the rotation of the rotor, occurs, the user can automatically and instinctively recognize the malfunction, and consequently can promptly take a countermeasure, such as replacement or repair of the coolant circulation device 22.

Next, a laser machining system 80 according to an embodiment of the invention will be described with reference to FIGS. 10 and 11. The laser machining system 80 includes a laser oscillator 82, a laser oscillator controller 84, and a laser processing head 100.

The laser oscillator 82 is e.g. a carbon dioxide laser oscillator, and includes an output mirror 86, a rear mirror 88, and a discharge tube 90. The laser oscillator 82 generates a laser beam in accordance with a command from the laser oscillator controller 84, and emits the generated laser beam from the output mirror 86.

The laser oscillator controller 84 controls the laser beam generation operation of the laser oscillator 82. Specifically, the laser oscillator controller 84 transmits a command relating to a laser power of the laser beam to be emitted from the laser oscillator 82, such as a laser output command, a frequency command, or a duty command.

The laser processing head 100 is optically connected to the output mirror 86 of the laser oscillator 82 via an optical path C formed by at least one mirror B. The laser processing head 100 receives the laser beam emitted from the output mirror 86, and condenses the received laser beam so as to radiate it onto the workpiece W.

The laser processing head 100 includes a connection 102, a main body 104, the optical members 16, a nozzle 106, a circulation path 108, the coolant circulation device 22, a heat dissipation fin 110, the fan 60, and a controller 112.

The controller 112 includes e.g. a CPU and a storage (not shown), and is mounted on the main body 104. The controller 112 directly or indirectly controls each component of the laser processing head 100.

In this embodiment, the controller 112 and the laser oscillator controller 84 are communicably connected to each other. The controller 112 and the laser oscillator controller 84 carry out a laser machining process onto the workpiece W, along with communicating with each other.

The connection 102 receives the laser beam propagating in the optical path C, and guides it to the optical members 16. The main body 104 is a hollow member, and defines an optical path of the laser beam inside thereof. The main body 104 holds the optical members 16. The nozzle 106 emits the laser beam condensed by the optical members 16 toward the workpiece W.

The circulation path 108 is a closed-flow path for circulating the coolant. In this embodiment, the circulation path 108 includes a flow path 108a, a flow path 108b, a flow path 108c, a flow path 108d, a flow path 108e, a flow path 108f, a flow path 108g, a flow path 108h, and coolant pools 108i and 108j.

The flow path 108a is defined by a hole formed at the connection 102. The flow path 108b is defined by a pipe separate from the connection 102, and fluidly connected to the flow path 108a and the flow path 108c.

The flow path 108c is defined by a hole formed at the heat dissipation fin 110. The flow path 108d is defined by a pipe separate from the main body 104, and fluidly connected to the flow path 108c and the flow path 108e. Each of the flow paths 108e and 108g is defined by a hole formed at the main body 104.

In this embodiment, a relief valve 109 is provided in the flow path 108g. The relief valve 109 is a pressure regulating valve which opens and closes the flow path 108g in response to a pressure of the coolant in the circulation path 108.

The relief valve 109 can prevent the circulation path 108 from being damaged by abnormal increase of the pressure in the circulation path 108 due to gasification of the coolant when the laser machining system 80 is stopped for a long time, for example.

The flow path 108f is defined by a hole formed at the nozzle 106, and fluidly connected to the flow path 108e and the flow path 108g. The flow path 108h is defined by a pipe separate from the main body 104 and the connection 102, and fluidly connected to the flow path 108a and the flow path 108g. The flow paths 108a to 108h are in fluid communication with each other, and form the closed circulation path 108.

The coolant pool 108i is an area which is formed at a mid-portion of the flow path 108g and which has an equivalent diameter (cross-sectional area) greater than the flow path 108g. The coolant pool 108i can temporarily store the coolant flowing in the flow path 108g.

The coolant pool 108j is an area which is formed at a mid-portion of the flow path 108e and which has an equivalent diameter (cross-sectional area) greater than the flow path 108e. The coolant pool 108j can temporarily store the coolant flowing in the flow path 108e.

Each of the coolant pools 108i and 108j is formed at a portion which is apt to be heated due to the laser beam propagating in the laser processing head 100. In this embodiment, the coolant pools 108i and 108j are disposed adjacent to the optical members 16. Note that, the coolant pool may be formed at the connection 102 (e.g., a mid-portion of the flow path 108a).

The heat dissipation fin 110 is mounted on an outer surface of the main body 104. As described above, the heat dissipation fin 110 is formed with the hole which extends through the heat dissipation fin 110 and which defines the flow path 108c.

Figure 12:
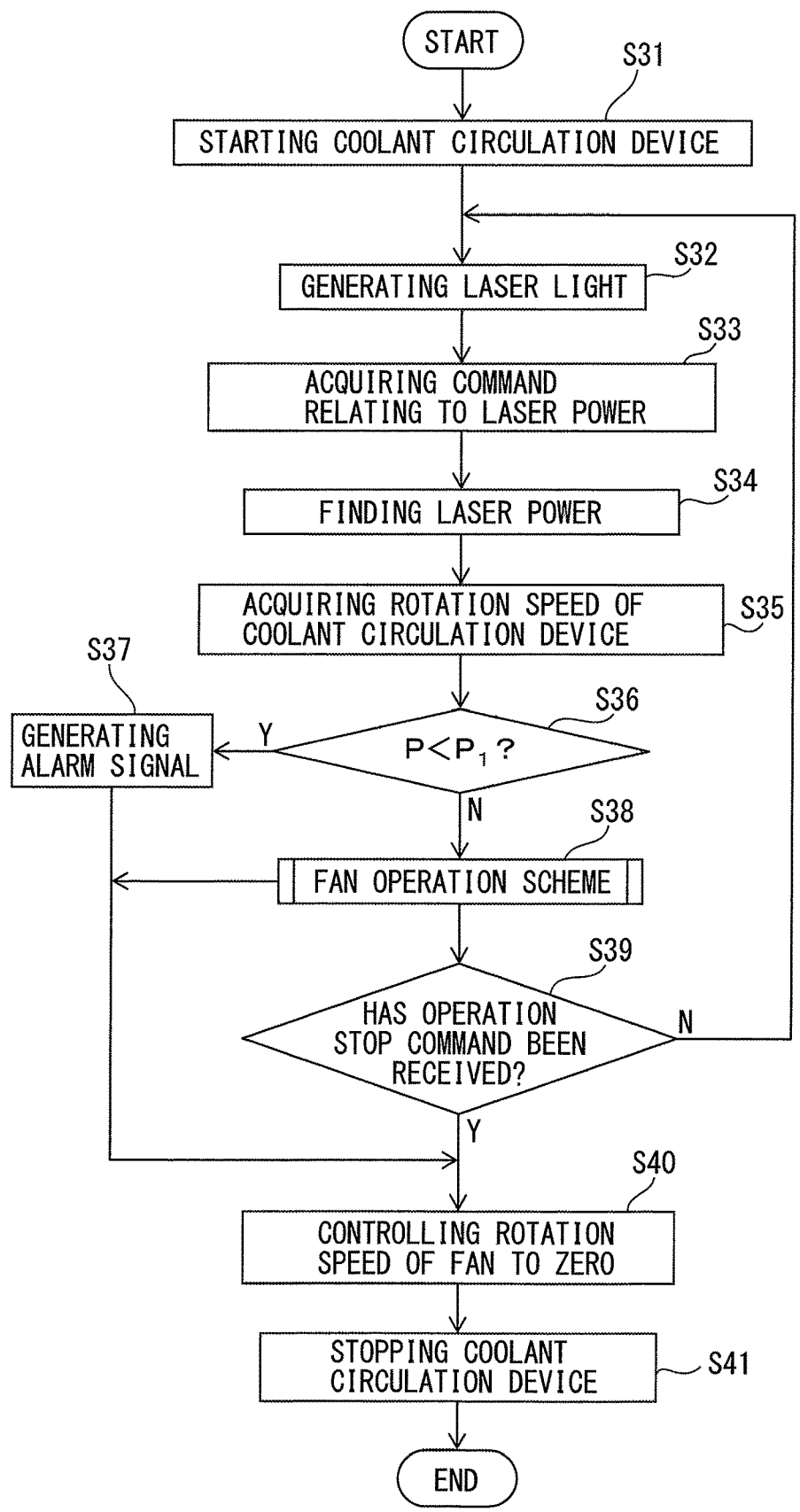
FIG. 12 is a flowchart showing an example of an operation flow of the laser machining system shown in FIG. 10.
Figure 13:
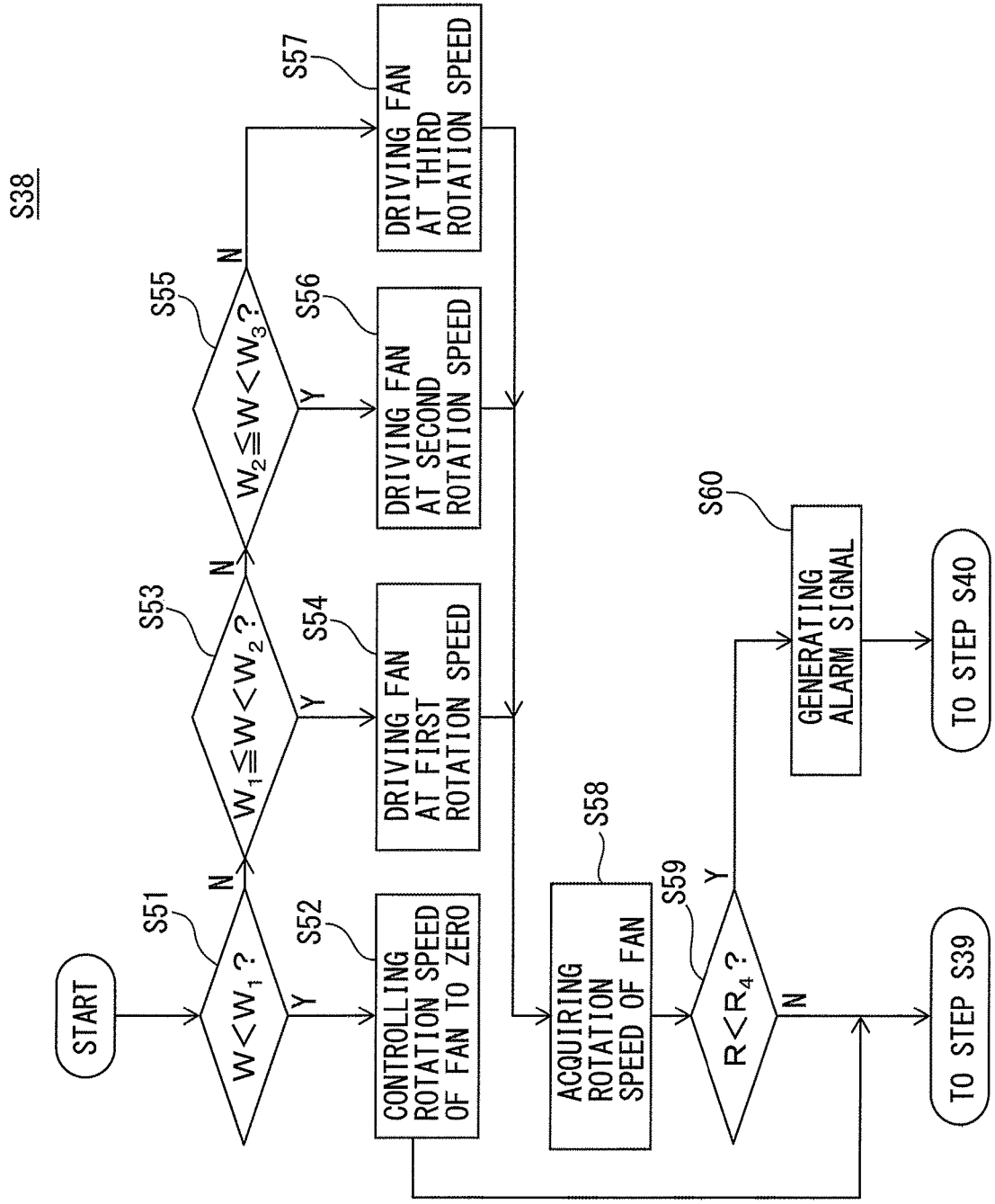
FIG. 13 is a flowchart showing an example of a flow of step S38 in FIG. 12.

Next, with reference to FIGS. 12 and 13, the operation of the laser machining system 80 will be described. The flow shown in FIG. 12 is started when the laser oscillator controller 84 receives a laser machining command from the user, the host controller, the laser machining program, or the like.

At step S31, the controller 112 transmits a rotation command to the motor 58 of the coolant circulation device 22 so as to rotate the coolant circulation device 22 at the rotation speed $P_0$, similarly to the above-mentioned step S1. Thereby, the fluid enclosed in the circulation path 108 flows and circulates in the circulation path 108.

At step S32, the laser oscillator controller 84 generates a laser beam. Specifically, in accordance with the above-mentioned laser machining command, the laser oscillator controller 84 transmits to the laser oscillator 82 a command relating to laser power of the laser beam to be emitted from the laser oscillator 82.

Specifically, the laser oscillator controller 84 transmits to the laser oscillator 82 a laser output command of continuous wave (CW), a frequency command or a duty command of pulse wave (PW). In accordance with the command received from the laser oscillator controller 84, the laser oscillator 82 generates a laser beam and emits it from the output mirror 86.

The laser processing head 100 receives the laser beam emitted from the output mirror 86 at the connection 102, and condenses the received laser beam by the optical member 16. Then, the laser processing head 100 emits the condensed laser beam from the nozzle 106 so as to radiate it onto the workpiece W. Thus, the workpiece is laser-machined in accordance with the laser machining command.

At step S33, the controller 112 acquires from the laser oscillator controller 84 the command transmitted by the laser oscillator controller 84 to the laser oscillator 82 at step S32. Specifically, the controller 112 acquires from the laser oscillator controller 84 the laser output command, the frequency command, or the duty command which has been transmitted to the laser oscillator 82.

At step S34, the controller 112 finds a laser power W of the laser beam emitted from the laser oscillator 82, based on the command acquired at step S33.

As an example, if the laser output command (e.g., 5 kW) of continuous wave (CW) is sent at step S32, the laser output command and the laser power of the laser beam emitted from the laser oscillator 82 substantially coincide with each other.

Accordingly, in this case, the controller 112 stores in the storage the laser output command (e.g., 5 kW) acquired at step S33 as the laser power W of the laser beam emitted from the laser oscillator 82.

As another example, if the controller 112 acquires the frequency command or the duty command at step S33, the controller 112 calculates an average value of the laser power from the frequency command or the duty command. The controller 112 stores the calculated average value as the laser power W of the laser beam emitted from the laser oscillator 82, in the storage of the controller 112.

At step S35, the controller 112 acquires the rotation speed P of the rotor of the coolant circulation device 22 through the encoder 68, similarly to the above-mentioned step S2.

At step S36, the controller 112 functions as the circulation device monitor 72 (FIG. 11) and determines whether or not P is less than $P_1$ ($P<P_1$), similarly to the above-mentioned step S3. When the controller 112 determines that P is less than $P_1$ (i.e., determines "YES"), it proceeds to step S37. On the other hand, when the controller 112 determines that P is equal to or greater than $P_1$ (i.e., determines "NO"), it proceeds to step S38.

At step S37, the controller 112 generates an alarm signal in the form of an image or sound indicating e.g. "Abnormality occurs in operation of fan", similarly to the above-mentioned step S4. Then, the controller 112 notifies the user of the alarm via the display or the speaker.

At step S38, the controller 112 carries out an operation scheme of the fan 60. Step S38 will be described with reference to FIG. 13.

After step S38 is started, at step S51, the controller 112 determines whether or not the laser power W found at step S34 most-recently executed is less than a predetermined threshold value $W_1$ of the laser power (i.e. $W<W_1$). The threshold value $W_1$ is predetermined by the user and stored in the storage of the controller 112.

When the controller 112 determines that W is less than the threshold value $W_1$ (i.e., determines "YES"), it proceeds to step S52. On the other hand, when the controller 112 determines that W is equal to or greater than $W_1$ (i.e., determines "NO"), it proceeds to step S53.

At step S52, the controller 112 controls the rotation speed R of the fan 60 to zero, similarly to the above-mentioned step S7. Then, the controller 112 proceeds to step S39 in FIG. 12.

At step S53, the controller 112 determines whether or not the laser power W found at step S34 most-recently executed is equal to or greater than the above-mentioned threshold value $W_1$ and is less than a predetermined threshold value $W_2$ of the laser power (i.e. $W_1 \leq W<W_2$). The threshold value $W_2$ is predetermined by the user so as to be greater than the threshold value $W_1$, and stored in the storage of the controller 112.

When the controller 112 determines that $W_1 \leq W<W_2$ is satisfied (i.e., determines "YES"), it proceeds to step S54. On the other hand, when the controller 112 determines that W is equal to or greater than $W_2$ (i.e., determines "NO"), it proceeds to step S55.

At step S54, similarly to the above-mentioned step S22, the controller 112 generates the first rotation command corresponding to the first rotation speed $R_1$, and transmits it to the fan motor 66 so as to rotate the fan 60 at the first rotation speed $R_1$.

At step S55, the controller 112 determines whether or not the laser power W determined at step S34 most-recently executed is equal to or greater than the above-mentioned threshold value $W_2$ and is less than a predetermined threshold value $W_3$ of the laser power (i.e. $W_2 \leq W<W_3$). The threshold value $W_3$ is predetermined by the user so as to be greater than the threshold value $W_2$, and stored in the storage of the controller 112.

When the controller 112 determines that $W_2 \leq W<W_3$ is satisfied (i.e., determines "YES"), it proceeds to step S56. On the other hand, when the controller 112 determines that W is equal to or greater than $W_3$ (i.e., determines "NO"), it proceeds to step S57.

At step S56, similarly to the above-mentioned step S24, the controller 112 generates the second rotation command corresponding to the second rotation speed $R_2$, and transmits it to the fan motor 66 so as to rotate the fan 60 at the second rotation speed $R_2$.

At step S57, similarly to the above-mentioned step S25, the controller 112 generates the third rotation command corresponding to the third rotation speed $R_3$, and transmits it to the fan motor 66 so as to rotate the fan 60 at the third rotation speed $R_3$.

Thus, in this embodiment, the controller 112 finds the laser power W based on the command which is transmitted from the laser oscillator controller 84 to the laser oscillator 82 at step S34, and operates the fan 60 at a rotation speed depending on the laser power W, at steps S51 to S57.

Accordingly, the controller 112 functions as a fan controller 114 (FIG. 11) which controls the fan 60 based on the command transmitted from the laser oscillator controller 84 to the laser oscillator 82.

At step S58, the controller 112 acquires the rotation speed R of the fan 60 through the encoder 70, similarly to the above-mentioned step S26.

At step S59, the controller 112 functions as the fan monitor 76 (FIG. 11) and determines whether or not R is less than $R_4$ ($R<R_4$), similarly to the above-mentioned step S27.

When the controller 112 determines that R is less than $R_4$ (i.e., determines "YES"), it proceeds to step S60. On the other hand, when the controller 112 determines that R is equal to or greater than $R_4$ (i.e., determines "NO"), it proceeds to step S39 in FIG. 12.

At step S60, similarly to the above-mentioned step S28, the controller 112 generates an alarm signal in the form of an image or sound indicating e.g. "Abnormality occurs in operation of coolant circulation device." Then, the controller 112 notifies the user of the alarm via the display or the speaker, and proceeds to step S40 in FIG. 12.

With reference to FIG. 12 again, at step S39, the controller 112 determines whether or not an operation stop command is received, similarly to the above-mentioned step S9.

When the controller 112 determines that it receives the operation stop command (i.e., determines "YES"), it proceeds to step S40. On the other hand, when the controller 112 determines that it does not receives the operation stop command (i.e., determines "NO"), it returns to step S32.

At step S40, the controller 112 controls the rotation speed R of the fan 60 to zero, similarly to the above-mentioned step S52.

At step S41, similarly to the above-mentioned step S11, the controller 112 transmits a command to the motor 58 of the coolant circulation device 22 so as to stop the motor 58 of the coolant circulation device 22. Then, the controller 112 ends the flow shown in FIG. 12.

In this embodiment, the circulation path 108 is configured as a closed-flow path. Accordingly, it is not necessary to provide a joint for connecting the coolant supply pipe extending from the external equipment at the circulation path 108, similarly to the above-mentioned embodiments.

Therefore, it is reliably prevent the components such as the optical members 16 from being contaminated due to leakage of the coolant caused by detaching the coolant supply pipe from the joint or by an attachment defect of the joint to the coolant supply pipe.

Further, since the coolant is not supplied to the circulation path 108 from the external equipment, it is not necessary for the user to perform a quality control (e.g., a temperature and a pH value) of the coolant supplied from the external equipment. On the other hand, the user can be easily control the quality of the coolant by periodically changing the coolant in the circulation path 108.

Further, by the heat dissipation fin 110 and the fan 60, the coolant in the circulation path 108 is cooled in a so-called air-cooled manner. Accordingly, it is possible to prevent dew condensation in the components of the laser processing head 100.

Further, in this embodiment, the controller 112 operates the fan 60 at a rotation speed depending on the laser power W of the laser beam emitted from the laser oscillator 82 (steps S51 to S57). According to this configuration, the operation efficiency of the fan 60 can be optimized, and therefore it is possible to restrain power consumption.

In this embodiment, the controller 112 is provided as an element separate from the laser oscillator controller 84. However, the controller 112 may be incorporated in the laser oscillator controller 84. In this case, the laser oscillator controller 84 functions as the controller 112.

Note that, a port for replacing or pouring the coolant may be provided at the circulation paths 20, 34, 42, 56, 108. In this case, the port is closed by a cover member during the operation of the laser processing heads 10, 30, 40, 50, 100.

Further, an indicator which enables the user to check the volume of the coolant in the circulation paths 20, 34, 42, 56, 108 may be provided.

Further, instead of the above-mentioned encoders 70, 68, an impedance detection part which detects impedances of the motors 58, 66 may be provided. If the rotation of the motors 58, 66 is disturbed due to a malfunction, fluctuations in the impedances of the motors 58, 66 occur. Accordingly, the controllers 64, 112 can detect a malfunction of the motors 58, 66 based on the impedances detected by the impedance detection part.

For example, at the above-mentioned step S2, the controller 64 acquires an impedance Z of the motor 58 from the impedance detection part. Then, at step S3, the controller 64 determines whether or not the acquired impedance Z differs from a predetermined threshold value $Z_1$ of the impedance (e.g., a difference $|Z-Z_1|$ is equal to or greater than a threshold value).

Alternatively, at the above-mentioned step S26, the controller 64 acquires the impedance Z of the fan motor 66 from the impedance detection part. Then, at step S27, the controller 64 determines whether or not the acquired impedance Z differs from a predetermined threshold value $Z_2$ of the impedance (e.g., a difference $|Z-Z_2|$ is equal to or greater than a threshold value). By such scheme, the operational abnormality in the motors 58, 66 can be detected.

Figure 6:
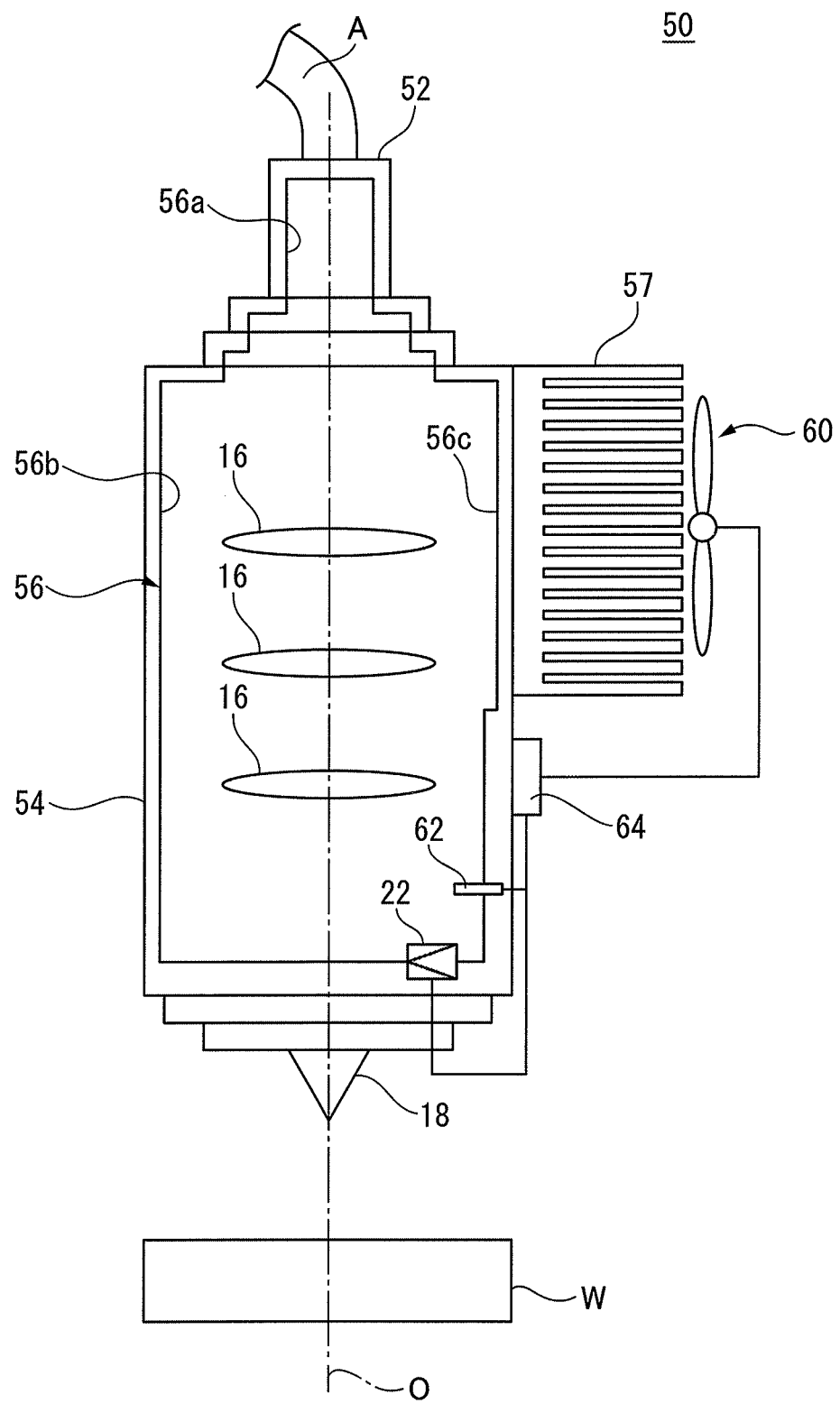
FIG. 6 is a diagram of a laser processing head according to still another embodiment.
Figure 7:
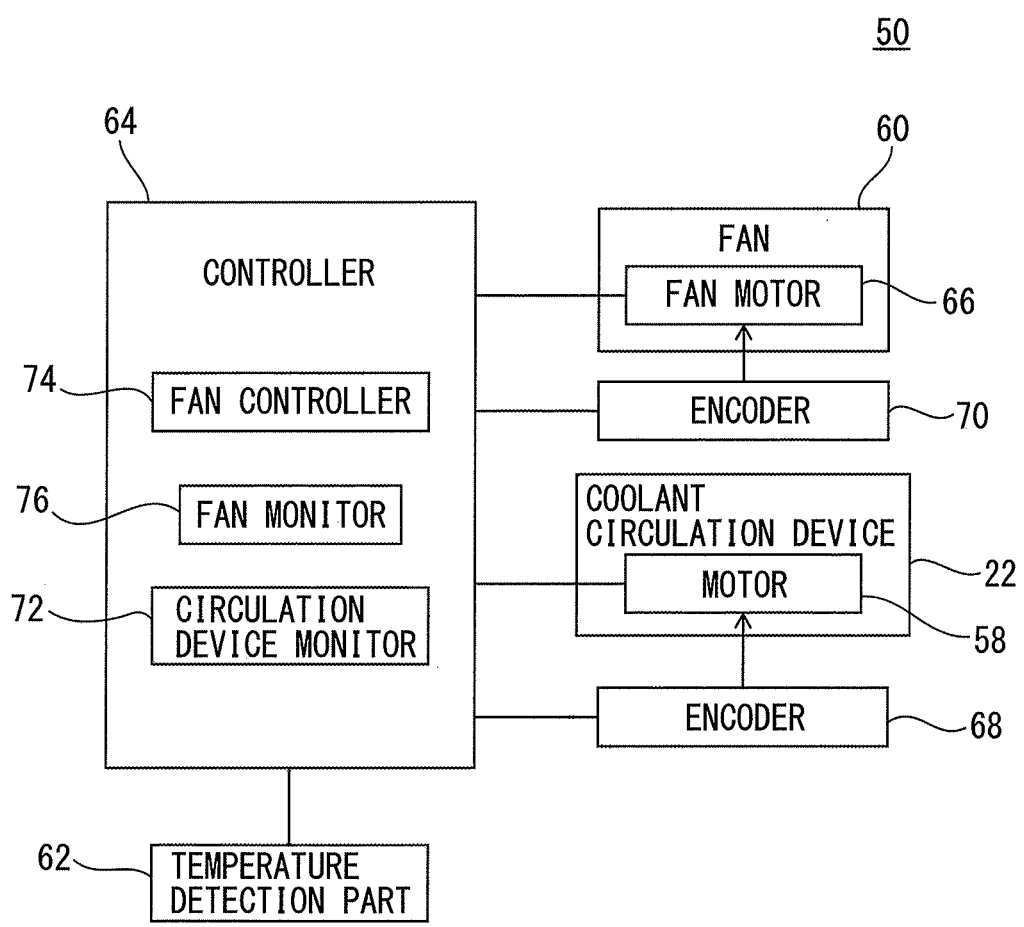
FIG. 7 is a block diagram of the laser processing head shown in FIG. 6.

Further, in the embodiment of FIG. 6, a plurality of temperature detection parts may be provided. In this case, at least one of the plurality of temperature detection parts may be disposed at a portion which is apt to be heated due to the laser beam (e.g., in the vicinity of the optical members 16 or at the connection 52).

Figure 10:
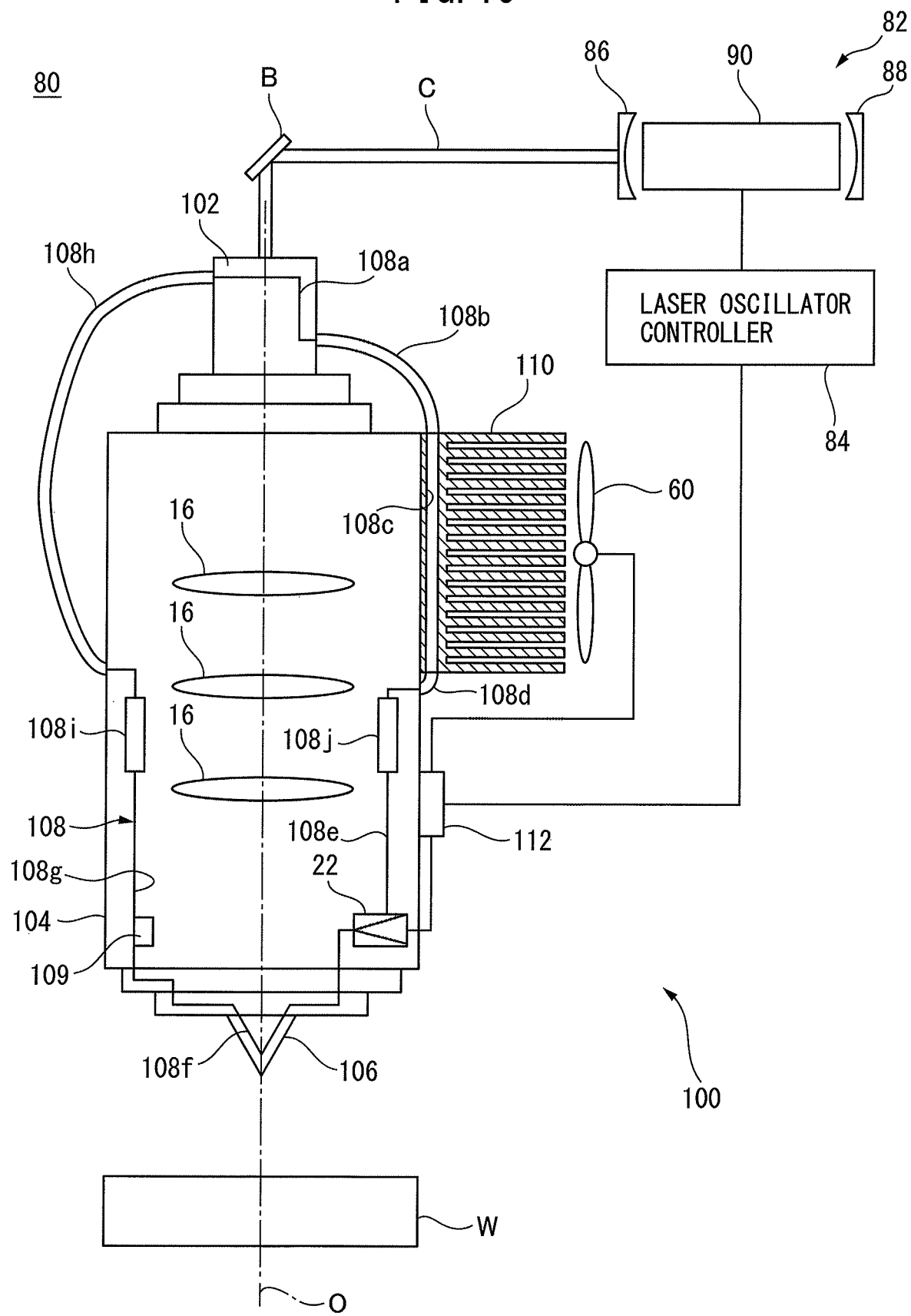
FIG. 10 is a diagram of a laser machining system according to an embodiment of the invention.
Figure 11:
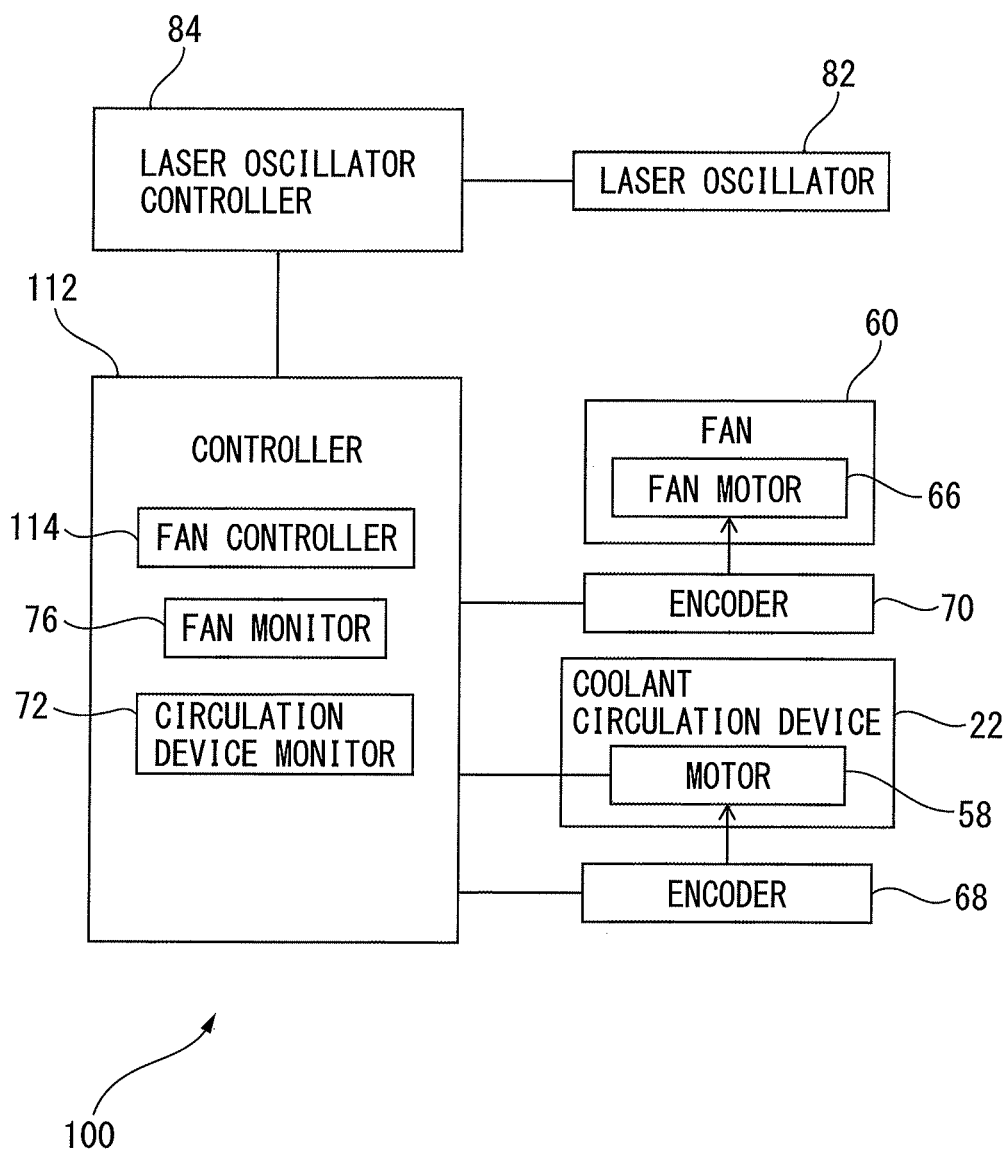
FIG. 11 is a block diagram of the laser machining system shown in FIG. 10.

Further, the circulation paths 20, 34, and 42 shown in FIGS. 1-5 can be applied to the embodiment shown in FIG. 6 or FIG. 10. In addition, the features of the embodiments shown in FIGS. 1-6 and 10 can be combined.

Figure 2:
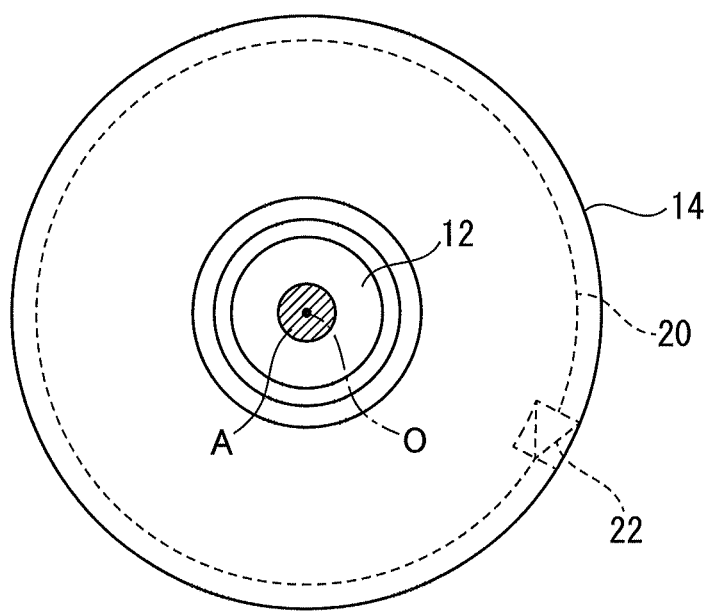
FIG. 2 is a cross-sectional view of the laser processing head shown in FIG. 1 cut along II-II in FIG. 1 and seen from axially upper direction (i.e. upward in FIG. 1)

For example, the circulation path 20 shown in FIG. 1 can be formed at the main body 104 of the laser processing head 100 shown in FIG. 10. In this case, the laser processing head 100 may include a first coolant circulation device that circulates the coolant in the circulation path 20 and a second coolant circulation device that circulates the coolant in the circulation path 108. Thus, the laser processing head can include a plurality of circulation paths and a plurality of coolant circulation devices.

In addition, the coolant pools 108$i$ and 108$j$ shown in FIG. 10 may be formed at a mid-portion of the circulation path 56 shown in FIG. 6.

Although the invention has been described above by way of embodiments, the embodiments as described above are not intended to limit the invention according to the claims. Moreover, although embodiments of the combinations of the features described by aspects of the invention may be also encompassed in the technical scope of the invention, all the combinations of these features are not necessarily essential to a solution of the invention. Further, it is also apparent to those skilled in the art that the embodiments as described above can be modified or improved in various ways.

It should be also noted that the order of execution of each processing in operations, procedures, steps, processes, stages, or the like in the device, system, program, and method as shown in the scope of claims, specification, and drawings is not explicitly defined, such as "before," "prior to," or the like in particular, and the processing can be implemented in any order unless the output of preceding processing is used in subsequent processing. Even though the description is made for convenience using "first," "next," "subsequently," "then" or the like regarding an operation flow in the scope of claims, specification, and drawings, this does not imply that it is mandatory that the processing should be implemented in this order.

The invention claimed is:

1. A laser processing head configured to condense and radiate a laser beam onto a workpiece, the laser processing head comprising:
   a head body including: a beam receiving part configured to receive the laser beam; and a beam emitting part configured to emit the laser beam received by the beam receiving part to an outside;

an optical member held in the head body, and configured to condense the laser beam received by the beam receiving part and guide the laser beam to the beam emitting part;

a looped and closed circulation path provided at the head body so as to extend in a looped manner at a position separate from an optical path of the laser beam and from a coolant supply device installed outside of the laser processing head, the looped and closed circulation path being configured to circulate a coolant for removing heat generated in the laser processing head due to the laser beam propagating in the laser processing head when the laser beam is radiated onto the workpiece; and a coolant circulation device including a rotor disposed in the looped and closed circulation path, and configured to cause the coolant to flow in the looped and closed circulation path so as to circulate in the looped and closed circulation path by rotating the rotor when the laser beam is radiated onto the workpiece.

2. The laser processing head according to claim 1, wherein the head body includes:

a main body which holds the optical member;

a connection provided at one end of the main body, and having the beam receiving part; and a nozzle provided at the other end of the main body, and having the beam emitting part, wherein the looped and closed circulation path is defined by:

a hole formed at the main body, the connection, or the nozzle; or a pipe attached to the main body, the connection, or the nozzle.

3. The laser processing head according to claim 1, wherein the looped and closed circulation path includes:

a flow path having a predetermined cross-sectional area; and a coolant pool connected to the flow path and having a cross-sectional area greater than that of the flow path, the coolant pool being arranged adjacent to the optical member so as to cool the optical member.

4. The laser processing head according to claim 1, wherein the looped and closed circulation path extend so as to surround the optical member.

* * * * *